(12) United States Patent
McGloin et al.

(10) Patent No.: US 11,050,783 B2
(45) Date of Patent: Jun. 29, 2021

(54) SYSTEM AND METHOD FOR DETECTING CLIENT PARTICIPATION IN MALWARE ACTIVITY

(71) Applicant: International Business Machines Corporation, Armonk, NY (US)

(72) Inventors: Mark A. McGloin, Dublin (IE); Olgierd S. Pieczul, Castleknock (IE); Kamil Stepinski, Mulhuddart (IE)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 15/884,940

(22) Filed: Jan. 31, 2018

(65) Prior Publication Data

US 2019/0238561 A1 Aug. 1, 2019

(51) Int. Cl.
*H04L 29/06* (2006.01)
*G06F 21/56* (2013.01)

(52) U.S. Cl.
CPC ............ *H04L 63/145* (2013.01); *G06F 21/56* (2013.01); *H04L 63/1416* (2013.01); *H04L 63/20* (2013.01)

(58) Field of Classification Search
CPC ............ G06F 11/1461; G06F 11/2069; G06F 11/2094; G06F 11/1458; G06F 21/577; G06F 21/6245; G06F 2221/034; G06F 21/604; H04L 63/1425; H04L 63/20
See application file for complete search history.

(56) References Cited

U.S. PATENT DOCUMENTS

| 8,578,491 | B2 | 11/2013 | McNamee et al. | |
|---|---|---|---|---|
| 9,426,171 | B1 | 8/2016 | Jezorek et al. | |
| 10,430,588 | B2* | 10/2019 | Volkov | H04L 63/1408 |
| 10,454,967 | B1* | 10/2019 | Zaslavsky | H04L 63/1483 |
| 2002/0032880 | A1 | 3/2002 | Poletto et al. | |
| 2009/0064332 | A1* | 3/2009 | Porras | H04L 63/1425 726/23 |

(Continued)

OTHER PUBLICATIONS

Zargar et al., "A Survey of Defense Mechanisms Against Distributed Denial of Service (DDoS) Flooding Attacks," IEEE Communications Surveys & Tutorials, vol. 15, No. 4, Fourth Quarter, 2013, pp. 2046-2069. DOI: 10.1109/SURV.2013.031413.00127.

(Continued)

*Primary Examiner* — Abu S Sholeman
(74) *Attorney, Agent, or Firm* — Nathan M. Rau

(57) ABSTRACT

A malware detection method for detecting client participation in malware activity, in respect of a target subjected to a given attack by a client system, which is operable to run a given host application is disclosed a given security service provider is configured, which is operably coupled to the client system, to make accessible given attack information that is reported by a given attack target. An attack status query is transmitted to the security service provider from an agent that is operably coupled to the client system. In response to receiving the attack status query, the security service provider is configured to send attack information reported in respect of a given attack target to the agent, and configuring the agent to diagnose whether its corresponding client system potentially comprises an attack source of the given attack subjected on the attack target, on a basis of the received attack information.

20 Claims, 5 Drawing Sheets

(56) References Cited

U.S. PATENT DOCUMENTS

| | | | |
|---|---|---|---|
| 2012/0159574 A1* | 6/2012 | Cheong | H04L 63/1458 726/3 |
| 2013/0298192 A1* | 11/2013 | Kumar | G06F 21/52 726/3 |
| 2015/0135316 A1* | 5/2015 | Tock | G06F 21/56 726/23 |
| 2015/0149611 A1* | 5/2015 | Lissack | H04L 43/16 709/224 |
| 2015/0326589 A1* | 11/2015 | Smith | H04L 63/02 726/1 |
| 2015/0373044 A1* | 12/2015 | Stiansen | H04L 63/1408 726/22 |
| 2017/0111386 A1 | 4/2017 | Adams et al. | |
| 2017/0155683 A1* | 6/2017 | Singla | G06F 21/604 |
| 2017/0171231 A1* | 6/2017 | Reybok, Jr. | G06F 16/23 |
| 2017/0279823 A1* | 9/2017 | Lin | H04L 63/0236 |
| 2017/0316203 A1* | 11/2017 | Reybok | G06F 21/552 |
| 2018/0124078 A1* | 5/2018 | Hajmasan | H04L 63/1408 |
| 2019/0297118 A1* | 9/2019 | Haugsnes | G06F 16/951 |
| 2019/0306181 A1* | 10/2019 | Mahadevia | H04L 63/1441 |
| 2020/0162429 A1* | 5/2020 | Burakovsky | H04L 61/2007 |
| 2020/0162514 A1* | 5/2020 | Rappard | H04L 61/2007 |

OTHER PUBLICATIONS

Zeng et al., "Detection of Botnets Using Combined Host- and Network-Level Information," 2010 IEEE/IFIP International Conference on Dependable Systems & Networks (DSN), 2010, pp. 291-300, IEEE. DOI: 10.1109/DSN.2010.5544306.

Patterson, D., "Exclusive: Inside the ProtonMail siege: how two small companies fought off one of Europe's largest DDoS attacks," TechRepublic, Nov. 13, 2015, pp. 1-13. https://www.techrepublic.com/article/exclusive-inside-the-protonmail-siege-how-two-small-companies-fought-off-one-of-europes-largest-ddos/.

"Simda Bot Free IP Scanner," Kasperky Lab, printed Jan. 31, 2018, pp. 1-2.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

\* cited by examiner

SYSTEM AND METHOD FOR DETECTING CLIENT PARTICIPATION IN MALWARE ACTIVITY

FIELD OF THE INVENTION

The present disclosure relates to a method, a system, a computer program product and a security service provider for detecting client participation in malware activity.

BACKGROUND

Denial of service attacks are becoming more frequent and pose a serious security problem. Basically, a denial of service attack is an attack method that is formulated by an attacker to deny access by legitimate users to an online service that they have subscribed to and paid for. Notwithstanding the fact that solutions have been formulated to address such attacks with some success, albeit such solutions usually being costly to develop and/or implement, the attacks are becoming more sophisticated. In this regard, attacks on elements of infrastructure that are not directly related to an attack target may be performed with a reasonably high success rate.

Many denial of service attacks are facilitated via compromised machines/computers. Not only is the designated target of a denial of service attack a victim of such an attack, so is a compromised machine that is used for the purpose of facilitating the attack. Thus, such compromised machines also share an incentive in stopping the occurrence of such an attack along with the target. In this regard, it may be difficult to determine whether a compromised machine is privy to facilitating a given attack, especially in the case of insignificant traffic being generated in respect of that machine and the malware used by the attacker to generate the attack not being identifiable by any security software installed on the compromised machine.

As the attacks become ever more complicated, blocking a compromised machine from a designated target of the attack may not bring any advantages to reducing the occurrence of such attacks since such blocking may only be performed when traffic reaches the target from any machine that it is connected with.

In response to an attack being launched on a given target, blocking of subsequent traffic by a given ISP (Internet Service Provider) in relation to that target requires a trust relationship to exist between them. This may be difficult to establish by the IP (Internet Protocol) address owner, for example, an ISP or Cloud Provider, on behalf of the attack target where the target is a customer of the ISP/Cloud provider rather than a client owned by ISP or Cloud provider. Furthermore, the capability of an ISP blocking a given target may potentially be open to abuse. Also, direct communication of an attack between a compromised machine and a designated attack target may not be possible and/or practical.

Some solutions to addressing denial of service attacks may be considered to be one-sided in their approach. In this regard, the designated target of an attack may be somehow configured to contain the attack or a compromised machine, hereinafter also referred to as an attack source, may be configured to detect any malware activity/malicious software.

Other solutions that focus on the ISP level may be effectuated by publishing a list of ISP addresses that may participate in an attack. However, this may be limited to the type of ISP and/or type of attack, and it also requires the potential attack source to be a participant by virtue of supplying attack information. Furthermore, since ISPs may periodically change their assignments, attack IPs may also change and so increased difficulty may be experienced in identifying an attack source, for example.

SUMMARY

According to an embodiment of an aspect of the present disclosure, there is provided a malware detection method for detecting client participation in malware activity, in respect of a target subjected to a given attack by a client system, which is operable to run a given host application, the method comprising the steps of: configuring a given security service provider, which is operably coupled to the client system, to make accessible given attack information that is reported by a given attack target; transmitting an attack status query to the security service provider from an agent that is operably coupled to the client system; in response to receiving the attack status query, configuring the security service provider to send attack information reported in respect of a given attack target to the agent, and configuring the agent to diagnose whether its corresponding client system potentially comprises an attack source of the given attack subjected on the attack target, on a basis of the attack information received from the security service provider. By using historical data on current and past attacks reported by given attack targets to the security service provider in relation to locally-available, security/operational information on a given client system, a diagnosis may be made on whether that client system comprises an attack source of a given attack subjected on a given attack target. An advantage associated with an embodiment of the present disclosure is that attack information is exchanged between the security service provider and the client system via at least an agent that is correspondingly provided in relation to the client system. Thus, sharing of such attack information may be performed on a relatively neutral platform. Because a given client system engages itself voluntarily, via its corresponding agent, in relation to determining its potential participation in malware activity, establishing of trust relationships may be substantially bypassed by way of an embodiment of the present disclosure. The occurrence of abuse scenarios are also potentially reduced because diagnosis and/or verification of the attack source status of a given client is done locally at its corresponding agent, which feature also extends the advantages of ease of implementation with reduced cost overheads.

Preferably, in the step of configuring the agent to diagnose whether its corresponding client system potentially comprises the attack source of the attack subjected on the attack target, the agent is operable to correlate given attack information received from the security service provider with given operational system data of the client system. This feature may be seen to reinforce the ability to determine whether a given client system is a legitimate attack source and/or to facilitate any false positives to be ruled out using information that is locally available on the client system and comparing it to external reports on attacks subjected on given attack targets.

Desirably, in response to the client system being diagnosed to comprise the attack source of the attack subjected on the attack target, it is accordingly configurable to take a given action locally to substantially repair any operational function thereof that is identified as contributing to its attack source status. By way of this feature, current and/or future contributions to any attacks subjected on a given attack target by a given client system may be substantially reduced. Furthermore, compared to a given implementation of a defence/security mechanism where the client source IP address may be blocked by the attack target, an embodiment of the present disclosure may be seen to provide the advantage of not impacting applications and/or systems that are not participants of a given attack on the attack target. Considering that the client system may, for example, be one of an ISP, enterprise organisation and a given Cloud Provider of Infrastructure as a service (IaaS) or Platform as a service (PaaS), blocking the source IP at the attack target and/or a given target system may have the potential to impact multiple client applications and/or systems that are not participant to a given attack. Likewise, considering that the attack target and/or a given target system may be one of an ISP, enterprise organisation and a given Cloud Provider of IaaS or PaaS, this may have the potential of impacting any systems relying on applications and/or systems hosted by the client.

Preferably, configuring the security service provider to comprise a data collection interface to which given attack information may be centrally reported from any given attack target. This feature may extend the advantage of facilitating reporting of attacks to the security service provider by attack targets with relative ease. Furthermore, it may be implemented with relatively few technical resources and/or configurational change(s) in respect of an embodiment of the present disclosure.

Desirably, configuring the security service provider to comprise an attack repository that is configurable to address a given attack status query received at the security service provider by sending given processed attack information pertaining substantially to a given source address of that query. This feature may be seen to extend the advantage of aggregating attack information reported at the security service provider by attack targets, thereby to facilitate ease of further processing, for example.

According to an embodiment of a further aspect of the present disclosure, there is provided a malware detection system for detecting client participation in malware activity, in respect of a target subjected to a given attack, by a client system that is operable to run a given host application, the system further comprising: a given security service provider, which is operably coupled to the client system, to make accessible given attack information that is reported by a given attack target; an agent that is operably coupled to the client system and that is configurable to transmit an attack status query to the security service provider; the security service provider being provided in relation to the agent, thereby to send attack information reported in respect of a given attack target to the agent, in response to receiving a given attack status query from the agent, and the agent being provided in relation to its corresponding client system, thereby to diagnose whether it potentially comprises an attack source of the given attack subjected on the attack target, on a basis of the attack information received from the security service provider.

According to an embodiment of yet a further aspect of the present disclosure, there is provided a computer program product for detecting client participation in malware activity in respect of a target subjected to a given attack by a client system that is operable to run a given host application, the computer program product comprising a computer-readable storage medium having program instructions embodied therewith that are executable to cause: a given security service provider, which is operably coupled to the client system, to make accessible given attack information that is reported by a given attack target; an agent that is operably coupled to the client system and that is configurable to transmit an attack status query to the security service provider; configuring of the security service provider to send attack information reported in respect of a given attack target to the agent, in response to receiving a given attack status query from the agent, and configuring of the agent to diagnose whether its corresponding client system potentially comprises an attack source of the given attack subjected on the attack target, on a basis of the attack information received from the security service provider.

According to an embodiment of yet a further aspect of the present disclosure, there is provided a security service provider in relation to detecting client participation in malware activity, in respect of a target subjected to a given attack, by a client system that is operable to run a given host application: the security service provider being operably coupled to the client system, to make accessible given attack information that is reported by a given attack target; the client system being operably coupled to an agent, which is configurable to transmit an attack status query to the security service provider; the security service provider being provided in relation to the agent, thereby to send attack information reported in respect of a given attack target to the agent, in response to receiving a given attack status query from the agent, and the agent being configurable to diagnose whether its corresponding client system potentially comprises an attack source of the given attack subjected on the attack target, on a basis of the attack information received from the security service provider.

All the advantages of any one of the features of an embodiment of one aspect of the present disclosure are also imparted to an embodiment of any other aspect.

The present disclosure has been described purely by way of example and modifications of detail may be made within the scope of the disclosure.

Each feature disclosed in the description and, where appropriate, the claims and drawings may be provided independently or in any appropriate combination.

BRIEF DESCRIPTION OF THE DRAWINGS

Reference will now be made, by way of example, to the accompanying drawings, in which.

Figure 1:
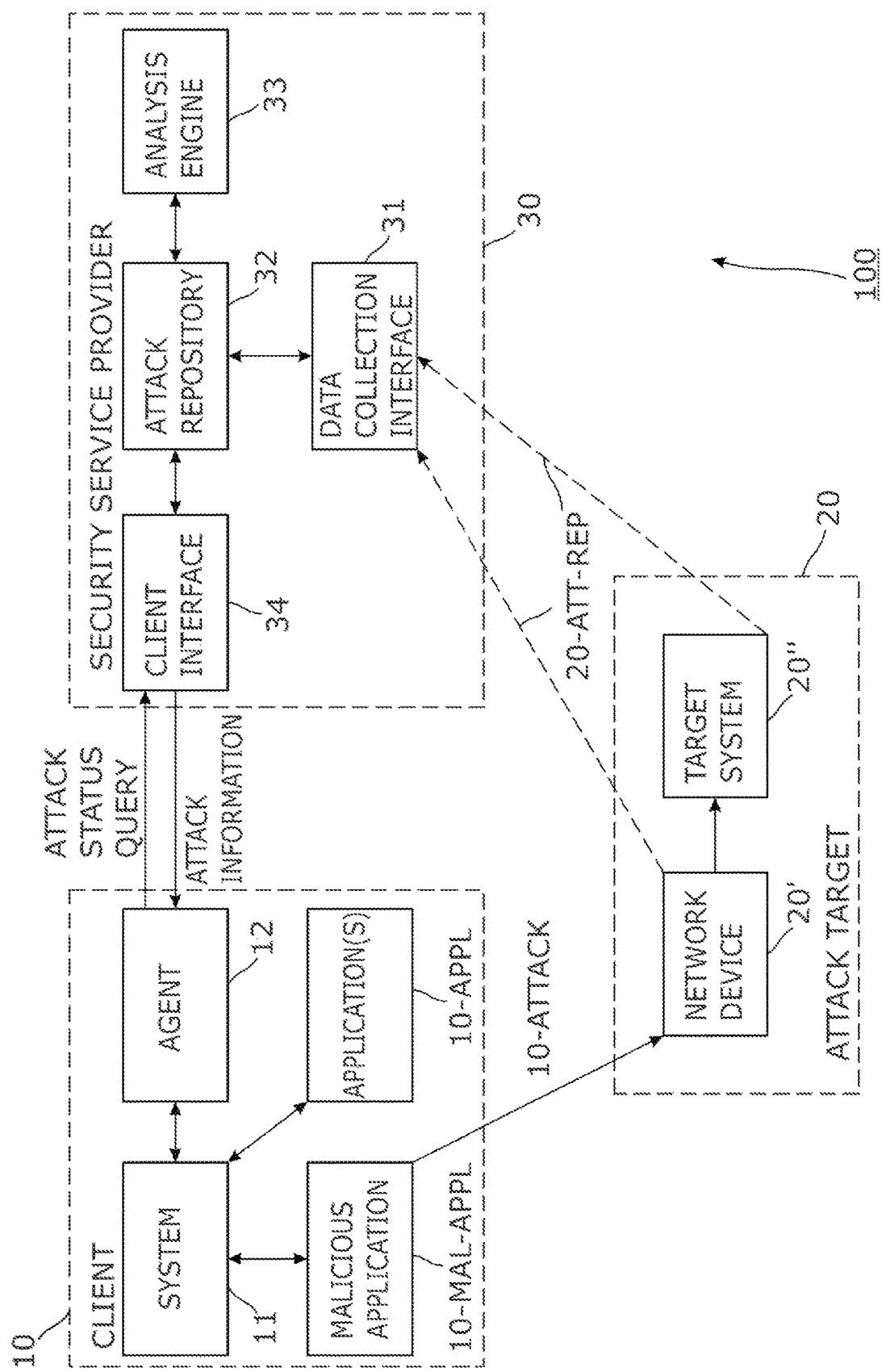
FIG. 1 shows an embodiment of a system aspect of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Within the description, the same reference numerals or signs are used to denote the same parts or the like.

Reference is now made to FIG. 1 that shows an embodiment of a system aspect 100 of the present disclosure comprising: a client 10, an attack target 20 that is subjected to a malicious attack 10-ATTACK, more specifically, a denial of service attack, by the client 10, and a security service provider 30 that is operably coupled to both the client 10 and the attack target 20.

In an embodiment of the present disclosure, the client 10 comprises a client system 11 that is operable to host and run a given application 10-APPL. By way of example, and as can be seen from FIG. 1, a malicious application 10-MAL-APPL may be installed on the client system 11 at a Cloud Provider by a rogue user of that Cloud Provider remotely accessing the client system 11, or it may be directly installed as malware on the client system 11. When the malicious application 10-MAL-APPL is run on the client system 11, a malicious attack 10-ATTACK is propagated to a designated attack target 20. Within the context of an embodiment of the present disclosure, a client system 11 that propagates a malicious attack 10-ATTACK is referred to as an attack source.

An agent 12 is also correspondingly provided in respect of, and operably coupled to, the client system 11. In an embodiment of the present disclosure, the security service provider 30 is operably coupled to the agent 12 corresponding to the client system 11, and also to the attack target 20. As can be clearly seen from the example shown in FIG. 1, the security service provider 30 may be provided so as to comprise: a data collection interface 31, an attack repository 32, an analysis engine 33 and a client interface 34.

Regarding the data collection interface 31 of the security service provider 30, it is operable to facilitate central reporting of any attack information. Such attack information may, for example, comprise an attack report 20-ATT-REP generated by an attack target 20 that has been subjected to a malicious attack 10-ATTACK. The attack report 20-ATT-REP may comprise information on any of the following taken individually or in any given combination: time of the attack; IP addresses of any parties involved, which may include that of the attack source, any intermediate machines/ISPs that were used to propagate the attack; if known, the type of attack; traffic information; protocols; port numbers, attack target 20, and so forth. By way of example, the attack target 20 may be some IP address, app or system hosted by a given ISP or an IP address owned by the ISP. In this case, attack notifications may be directed to the ISP by virtue of owning the IP address or by direct detection of the attack.

Regarding the attack repository 32 of the security service provider 30, it is configurable to store any attack information it receives from the data collection interface 31. An analysis engine 33 may also be provided in an embodiment of the present disclosure, which is operably coupled to the attack repository 32. It may be applied to process data/attack information, held in the attack repository 32 and to appropriately update such attack information with information from other sources, such as, for example, an IP reputation service and/or a domain service providing IP ownership details. The security service provider 30 is configurable to make accessible such processed attack information held at the attack repository 32, via client interface 34, in response to receiving an attack status query from a given agent 12. In this regard, the agent 12 could provide the IP address of the client system 11, along with the attack status query, at the client interface 34 of the security service provider 30, in order to access and gain any relevant attack information. In a preferred embodiment of the present disclosure, the attack repository 32 is provided thereby to be operable to address a given attack status query received at the security service provider 30 by sending attack information pertaining substantially to a given source address of that query.

In an embodiment of the present disclosure, the designated attack target 20 may comprise a given network device 20' or a target system 20". Where the attack target 20 comprises a network device 20', it may be in the network of any entity including an individual, an ISP, an enterprise customer or Cloud Provider, for example. Where the attack target 20 comprises a target system 20", it may reside in a different network but be owned by a different entity, for example, an ISP relationship to home and business customers. Alternatively, and by way of example, a given target IP address 20' may be a proxy to a target system 20" in a different network.

In response to receiving a given attack status query from the agent 12, the security service provider 30 is configurable to send attack information reported in respect of a given attack target 20 to the agent 12.

In an embodiment of the present disclosure, the agent 12 is configurable to locally diagnose whether its corresponding client system 11 potentially comprises an attack source of an attack 10-ATTACK subjected on the attack target 20, on a basis of the attack information that it receives from the security service provider 30, in response to sending a given attack status query thereto. The agent 12 may be configured/managed by the client system 11 to transmit a given attack status query to the security service provider 30 at a specified time, for example, periodically, after a given time interval or based on some internal activity of the client system 11.

In a preferred embodiment of the present disclosure, the agent 12 is configurable to diagnose whether its corresponding client system 11 potentially comprises the attack source of an attack 10-ATTACK subjected on the attack target 20 by correlating given attack information received from the security service provider 20 with given operational system data of the client system 11. For example, the agent 12 may be configured to examine traffic and/or system logs, or examine hosted applications 10-APPL on the client system 11, in relation to corresponding aspects of given attack information received from the security service provider 30.

The diagnosis performed by the agent 12, as above-described, is: to determine if the attack source status of its corresponding client system 11 is legitimate, a false positive or perhaps associated with some sub-component of the client system 11, such as malware or a malicious application/app that may need to be isolated; for risk assessment, and, additionally, for use in determining a given action to be performed to substantially remove/address the attack source status of the client system 11. The manner in which the agent 12 may be configured to perform such a diagnosis depends on how it is deployed with respect to the client system 11: if it resides on a machine, system information may be examined, for example, firewall logs, to see if the attack source status is legitimate, or if it is deployed in a Cloud Provider where the source IP fronts multiple applications, the agent 12 may be set up to query Cloud Provider logs to determine the source of the attack, which may be a hosted app on the client system 11.

In response to the agent 12 diagnosing its corresponding client system 11 to comprise the attack source of an attack 10-ATTACK subjected on the attack target 20, the client system 11 is accordingly configurable to take at least a given action locally to substantially address/repair any operational function thereof that is identified as contributing to its attack source status. Such an action may, for example be to identify the given malware/malicious application 10-MAL-APPL running on the client system 11, and to perform any one or more of the following actions in respect thereof: quarantine it, block it, block any outbound traffic from the client system 11, and/or raise a corresponding alert. Any information acquired by a given client system 11 on its attack source status may be reported back to the security service provider 30 via its corresponding agent 12.

Figure 2:
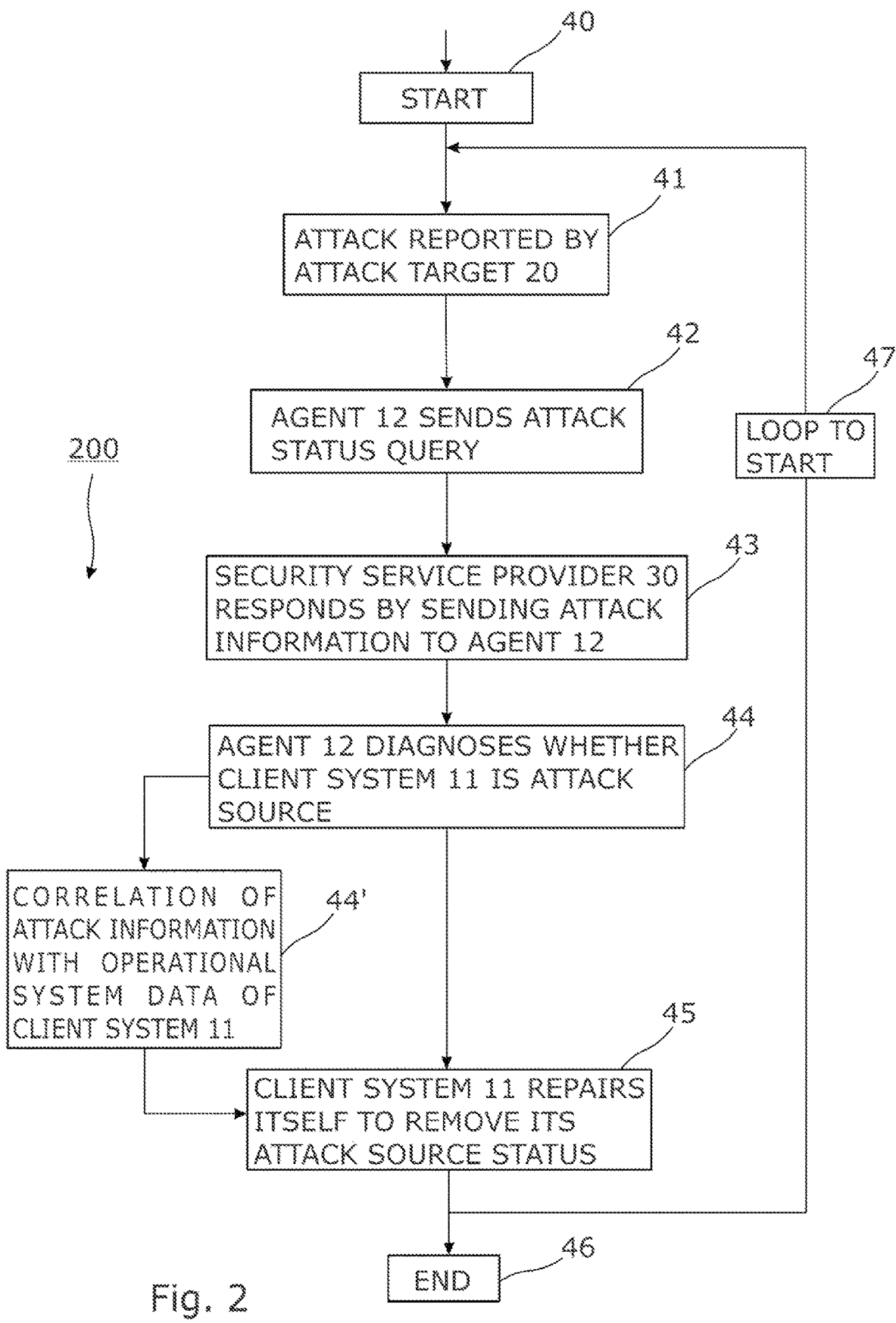
FIG. 2 is a flowchart of an embodiment according to a method aspect of the present disclosure.

Reference is now made to FIG. 2, which is a flowchart of an embodiment according to a method aspect 200 of the present disclosure.

Operation according to an embodiment of a method aspect 200 is started at block 40.

Viewing FIG. 2 in combination with FIG. 1, in a target-specific event performed at block 41, at least a given attack target 20 reports that it has been subjected to a malicious attack 10-ATTACK and accordingly posts an attack report 20-ATT-REP to the data collection interface 31 of the security service provider 30. The attack report 20-ATT-REP is transmitted to the attack repository 32, where it may be processed by the analysis engine 33, to subsequently be made available as a given part of attack information, on receipt of an attack status query at the client interface 34 of the security service provider 30, from an agent 12 investigating a given attack source status of at least a corresponding client system 11.

In a client-specific event performed at block 42, a given agent 12 interrogates the security service provider 30 on a given attack source status of at least a client system 11 corresponding thereto. Viewing FIG. 2 in combination with FIG. 1, such an interrogation is performed by the agent 12 transmitting an attack status query to the client interface 34 of the security service provider 30.

At block 43, in response to receiving the attack status query from the agent 12, the security service provider 30 is configurable to send attack information reported in respect of least a given attack target 20 to the agent 12. Viewing FIG. 2 in combination with FIG. 1, the security service provider 30 is configurable to send attack information held in its attack repository 32, via its client interface 34, to the agent 12 from where the attack status query is generated at block 42. Such attack information would typically comprise any information reported to the security service provider 30 at block 41, for example.

Progressing to block 44, the agent 12 diagnoses whether its corresponding client system 11 potentially comprises an attack source of the given attack 10-ATTACK subjected on the attack target 20 reporting such an attack at block 41, on at least a basis of the attack information received at the agent 12 from the security service provider 30 at block 43. In a preferred embodiment of the present disclosure, and as generally shown at block 44', such a diagnosis is performed at the agent 12 by correlation of the attack information received from the security service provider 30 with given operational system data of its corresponding client system 11.

Moving on to block 45, in response to the client system 11 being diagnosed at block 44 to comprise the attack source of the given attack 10-ATTACK subjected on the attack target 20, it is accordingly configurable to take at least a given action to substantially repair any operational function thereof that is identified as contributing to its attack source status. Such an action may, for example be to identify the given malware/malicious application 10-MAL-APPL running on the client system 11 that may be the source of the given malicious attack 10-ATTACK subjected on the attack target 20, and to perform any one or more of the following actions in respect thereof: quarantine it, block it, block any outbound traffic from the client machine 10, and/or raise a corresponding alert. Any information pertaining and/or contributing to the attack source status of the client system 11 may be reported back to the security service provider 30 via its corresponding agent 12. Any actions pertaining to the repairing of the client system 11 to substantially address and/or remove its attack source status may be performed using security software installed on the client machine 11.

Progress may be made to block 45, which marks the end of any steps performed according to an embodiment of the method aspect 200 of the present disclosure, or a loop may be performed to block 40 to repeat the procedure for a specifiable number of times and/or over a given time-period.

An example is now given of an embodiment of the present disclosure in which Malware is deployed on a machine in a client system 11 comprising an enterprise organisation. The malware may have been installed by any number of means and may go undetected by any Anti-virus or Malware detection system if the signature is new. This is typical for sophisticated malware where it continuously morphs and uses encryption to evade signature-based and even anomaly-based malware detection:

A malicious attack 10-ATTACK is propagated to a given designated attack target 20 via malware 10-MAL-APPL that is installed and run on a given client system 11;

The attack target 20 sends an attack report 20-ATT-REP to the security service provider 30, comprising a time log in which, at a given time T1, potentially suspicious malware was received at the attack target 20;

In the meantime, agent 12 related to the client system 11, from where the malicious attack 10-ATTACK was propagated to the attack target 20, transmits an attack status query to the security service provider 30;

In response to receiving the attack status query, the security service provider 30 sends attack information comprising details on the attack report 20-ATT-REP received from the attack target 20 to the agent 12;

Agent 12 uses the attack information to diagnose whether the its corresponding client system 11 is potentially the attack source of the attack 10-ATTACK propagated to the attack target 20;

Such a diagnosis is performed by correlating the attack information received from the security service provider 30 with operational system information held on/at the client system 11;

From the operational system information, logs pertaining to the client system 11 are obtained and a correlation is performed to verify the attack 10-ATTACK was from the client system 11 and furthermore to identify where in the client system 11 the attack emanated from;

Agent 12 uses the traffic logs to compare T1, the time reported for 10-ATTACK, with T2, the time outbound traffic target system 20 was reported. Agent 12 uses the traffic logs to determine the source machine and port related to that outbound traffic;

Agent 12 may query the source machine for operational logs to further isolate the process sending traffic from that port. In some instances, the agent 12 may trigger an alert to operational staff for client system 11 to further investigate the cause of the malicious traffic by providing the operational staff with attack information and related operational logs.

Agent 12 may trigger the client system 11 to take a given action to substantially repair any operational function that is identified as contributing to its attack source status. Such an action may be to block outbound traffic from that source machine on a firewall or proxy. The action may be to stop the process on the machine where such a process has been automatically identified. In some instances, the agent 12 may trigger an alert to operational staff managing the client system 11 to both further investigate the cause of malicious traffic and perform any repair activity.

In a further example of an embodiment of the present disclosure where the client system 11 comprises a Cloud Provider providing IaaS or PaaS resources and a trial user who exploits free resources to deploy a malicious app. The Malicious application triggers an outbound application DoS attack or port scanning against a target system 20" which may not be picked up by the Cloud Provider:

- A malicious attack 10-ATTACK is propagated to a given designated attack target 20 via a malicious application 10-MAL-APPL that is installed and run on a given client system 11;
- The attack target 20 sends an attack report 20-ATT-REP to the security service provider 30, comprising a time log in which, at a given time T1, potentially suspicious malware was received at the attack target 20;
- In the meantime, agent 12 related to the client system 11, from where the malicious attack 10-ATTACK was propagated to the attack target 20, transmits an attack status query to the security service provider 30;
- In response to receiving the attack status query, the security service provider 30 sends attack information comprising details on the attack report 20-ATT-REP received from the attack target 20 to the agent 12;
- Agent 12 uses the attack information to diagnose whether the its corresponding client system 11 is potentially the attack source of the attack 10-ATTACK propagated to the attack target 20;
- Such a diagnosis is performed by correlating the attack information received from the security service provider 30 with operational system information held on/at the client system 11;
- From the operational system information, logs pertaining to the client system 11 are obtained and a correlation is performed to verify the attack 10-ATTACK was from the client system and furthermore to identify where in the client system 11 the attack emanated from;
- Agent 12 uses the traffic logs to compare T1, the time reported for 10-ATTACK, with T2, the time outbound traffic target system 20 was reported. Agent 12 uses the traffic logs to determine the source machine and port related to that outbound traffic;
- Agent 12 may query the source machine for operational logs to further isolate the container or application sending traffic from that port. In some instances, the agent 12 may trigger an alert to operational staff managing client system 11 to further investigate the cause of the malicious traffic by providing the operational staff with attack information and related operational logs;
- Agent 12 may trigger the client system 11 to take a given action to substantially repair any operational function that is identified as contributing to its attack source status. Such an action may be to shut down the container or application. Further action may be to shut down other applications or containers linked to the same Cloud Provider account to prevent the attack being triggered from a new container or application. In some instances, the agent 12 may trigger an alert to operational staff managing client system 11 to both further investigate the cause of malicious traffic and perform any repair activity.

Whilst an embodiment of the present disclosure has been described with reference to a single client system 11 comprising an attack source and/or a single attack target 20, it is not restricted thereto and, in fact, may be usually implemented in respect of multiple clients 10/client systems 11 and/or attack targets 20.

The security service provider 30 in an embodiment of the present disclosure may be provided separately and as a supplementary feature to any one of an existing malware detection system and method for the detection of malware activity.

Figure 3:
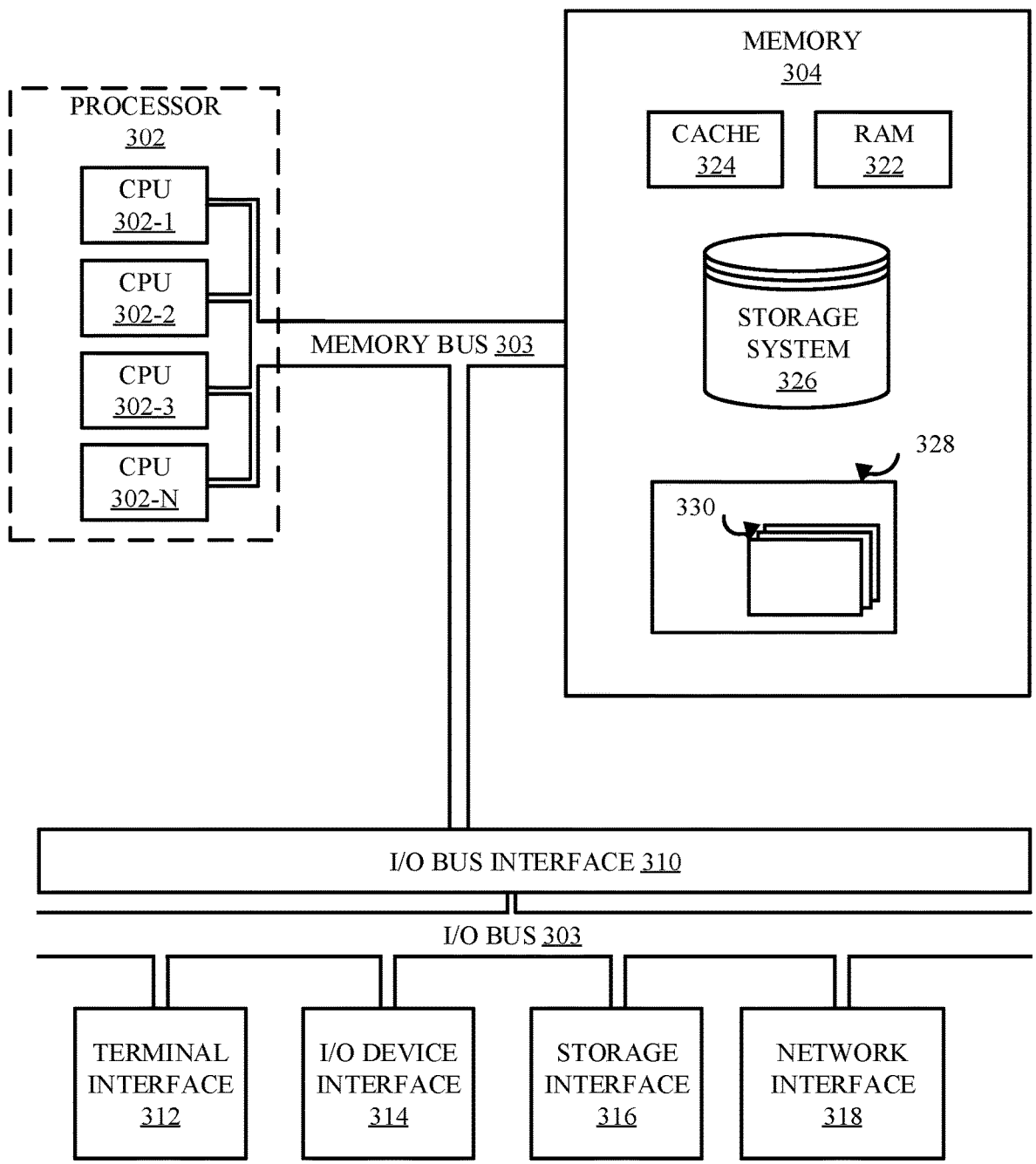
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
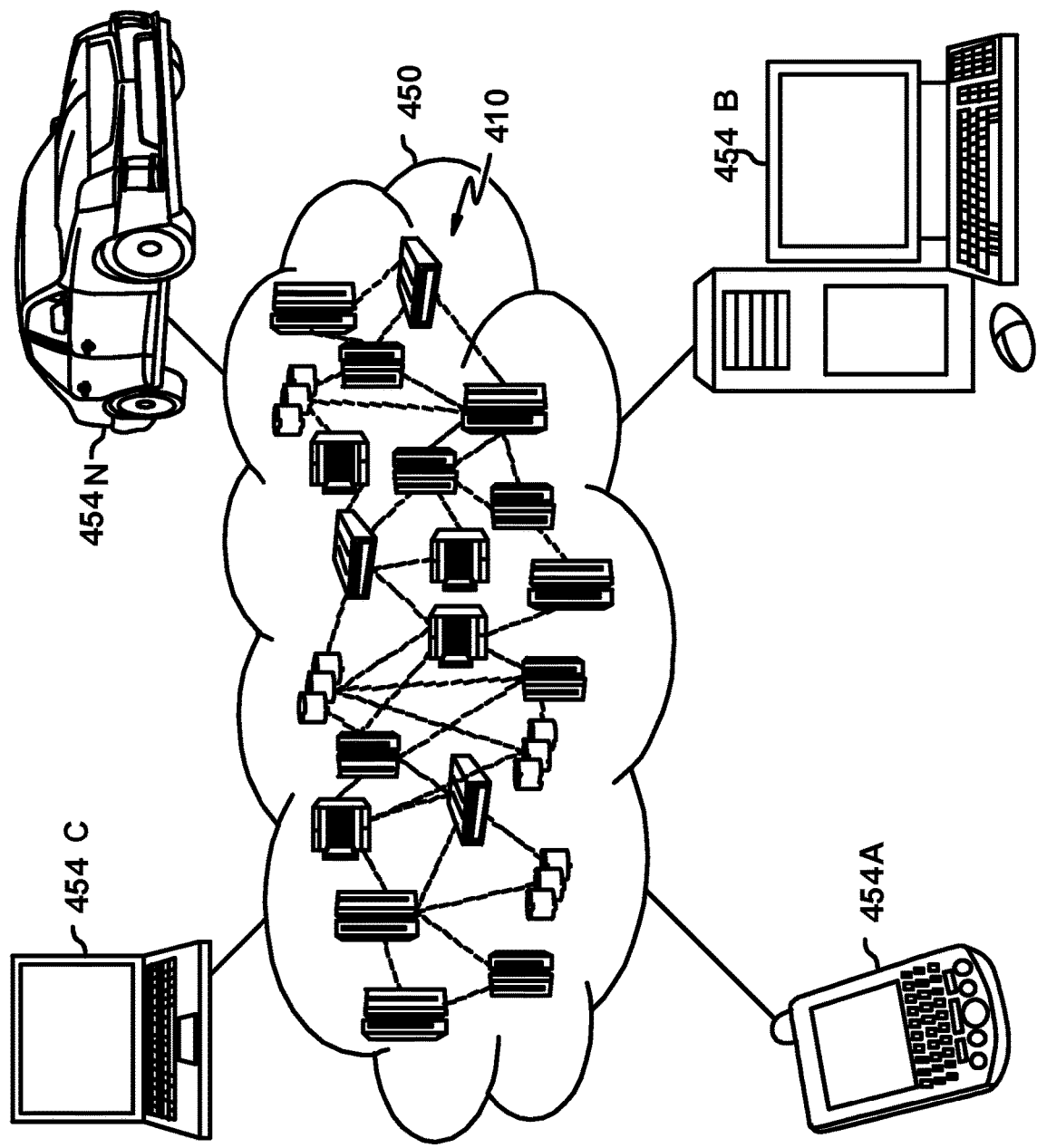
FIG. 4 is a diagrammatic representation of an illustrative cloud computing environment.

The system 100 and method 200 may be employed in a cloud computing environment. FIG. 4, is a diagrammatic representation of an illustrative cloud computing environment 450 according to one embodiment. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 5 and cloud computing environment 450 may communicate with any type of computerized device over any type of network and/or network addressable connection (e.g., using a web browser).

Figure 5:
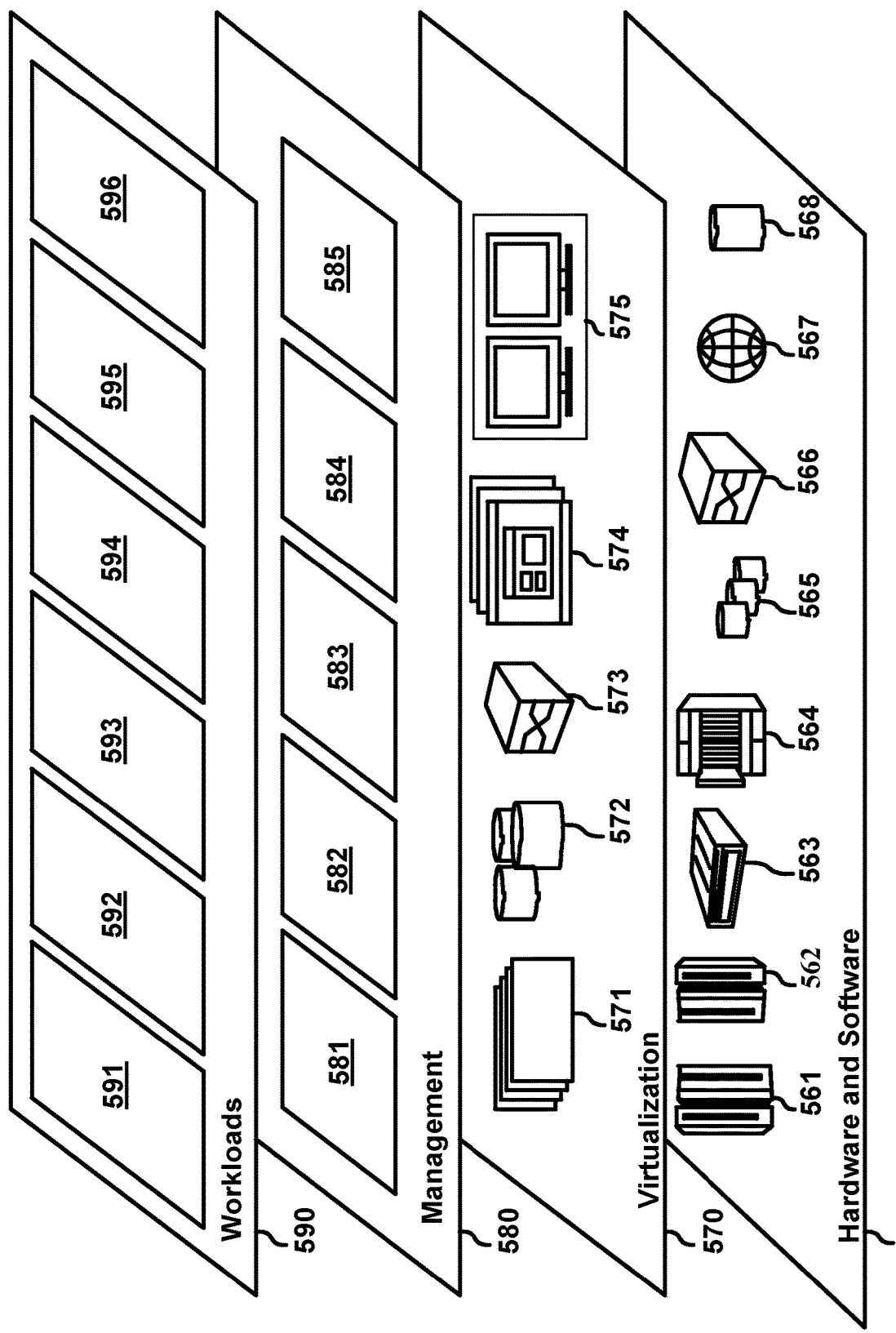
FIG. 5 illustrates a set of functional abstraction layers provided by cloud computing environment according to one illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; layout detection 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present disclosure may be a system, a method and/or a computer program product at any possible technical level of integration. The computer program product may include a computer readable storage medium (or media) having computer readable program instructions thereon for causing a processor to carry out the aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable storage instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages including an object oriented program language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In any of the above aspects, the various features may be implemented in hardware or as software modules running on one or more data processors.

The present disclosure has been described above purely by way of example and modifications of detail can be made within the scope of the present disclosure.

Each feature disclosed in the description, and where appropriate, the claims and/or the drawings may be provided independently or in any appropriate combination.

What is claimed is:

1. A malware detection method for detecting client participation in malware activity, in respect of a target subjected to a given attack by a client system, which is operable to run a given host application, the method comprising the steps of:
    configuring a given security service provider, which is operably coupled to a client system, to make accessible given attack information that is reported by a given attack target, wherein the client system is a malware activity participant;
    transmitting an attack status query to the security service provider from an agent that is operably coupled to the client system;
    in response to receiving the attack status query, configuring the security service provider to send attack information reported in respect of a given attack target to the agent, and
    configuring the agent to locally diagnose whether the client system coupled to the agent potentially comprises an attack source of the given attack subjected on the attack target, on a basis of the attack information received from the security service provider.

2. The malware detection method of claim 1 wherein, in the step of configuring the agent to diagnose whether the client system potentially comprises the attack source of the attack subjected on the attack target, the agent is operable to correlate given attack information received from the security service provider with given operational system data of the client system.

3. The malware detection method of claim 1 further comprising the step of:
    in response to the client system being diagnosed to comprise the attack source of the attack subjected on the attack target, repairing any operational function thereof that is identified as contributing to its attack source status.

4. The malware detection method of claim 1 further comprising the step of:
    configuring the security service provider to comprise a data collection interface to which given attack information may be centrally reported from any given attack target.

5. The malware detection method of claim 1 further comprising the step of:
    configuring the security service provider to comprise an attack repository that is configurable to address a given attack status query received at the security service provider by sending given processed attack information pertaining substantially to a given source address of that query.

6. The malware detection method of claim 1, wherein locally diagnosing whether the client system potentially comprises an attack source of the given attack subjected on the attack target comprises correlating the attack information received from the security service provider to locally-available operational information held on the client system.

7. The malware detection method of claim 6, wherein the locally-available operational information comprises traffic logs and system logs.

8. The malware detection method of claim 1, wherein the attack source comprises a malicious application (MAL-APPL) installed on the client system.

9. The malware detection method of claim 8, wherein the MAL-APPL is adapted to morph to evade signature-based and anomaly-based malware detection.

10. The malware detection method of claim 9, wherein the given attack comprises a denial of service attack.

11. A malware detection system for detecting client participation in malware activity, in respect of a target subjected to a given attack, by a client system that is operable to run a given host application, the system further comprising:
at least one memory device;
at least one processor, the at least one processor configured to implement:
a given security service which is operably coupled to a client computing system, and configured to make accessible given attack information that is reported by a given attack target; and
an agent, executing on the client computing system configured to transmit an attack status query to the security service;
wherein:
the client system is a malware activity participant;
the security service being provided in relation to the agent, thereby to send attack information reported in respect of a given attack target to the agent, in response to receiving a given attack status query from the agent, and
the agent being provided in relation to the client computing system, thereby to locally diagnose whether the client computing system potentially comprises an attack source of the given attack subjected on the attack target, on a basis of the attack information received from the security service.

12. The system of claim 11 wherein, in relation to diagnosing whether the client computing system potentially comprises the attack source of the attack subjected on the attack target, the agent is operable to correlate given attack information received from the security service with given operational system data of the client system.

13. The system of claim 11 wherein, in relation to the client computing system being diagnosed as comprising the attack source of the attack subjected on the attack target, repairing any operational function thereof that is identified as contributing to its attack source status.

14. The system of claim 11 wherein, the security service is configurable thereby to comprise a data collection interface to which given attack information may be centrally reported from any given attack target.

15. The system of claim 11 wherein, the security service is configurable thereby to comprise an attack repository that is configurable to address a given attack status query received at the security service by sending given processed attack information pertaining substantially to a given source address of that query.

16. A computer program product for detecting client participation in malware activity in respect of a target subjected to a given attack by a client system that is operable to run a given host application, the computer program product comprising a non-transitory computer-readable storage medium having program instructions embodied therewith that are executable to cause:
a given security service provider, which is operably coupled to a client system, to make accessible given attack information that is reported by a given attack target, wherein the client system is a malware activity participant;
an agent that is operably coupled to the client system and that is configurable to transmit an attack status query to the security service provider;
configuring of the security service provider to send attack information reported in respect of a given attack target to the agent, in response to receiving a given attack status query from the agent, and
configuring the agent to locally diagnose whether the client system coupled to the agent potentially comprises an attack source of the given attack subjected on the attack target, on a basis of the attack information received from the security service provider.

17. The computer program product of claim 16, the computer-readable storage medium having program instructions embodied therewith that are executable to cause: in the step of configuring the agent to diagnose whether the client system potentially comprises the attack source of the attack subjected on the attack target, the agent is operable to correlate given attack information received from the security service provider with given operational system data of the client system.

18. The computer program product of claim 16, the computer-readable storage medium having program instructions embodied therewith that are executable to cause: in response to the client system being diagnosed to comprise the attack source of the attack subjected on the attack target, repairing any operational function thereof that is identified as contributing to its attack source status.

19. The computer program product of claim 16, the computer-readable storage medium having program instructions embodied therewith that are executable to cause: configuring of the security service provider thereby to comprise a data collection interface to which given attack information may be centrally reported from any given attack target.

20. The computer program product of claim 16, the computer-readable storage medium having program instructions embodied therewith that are executable to cause: configuring of the security service provider to comprise an attack repository that is configurable to address a given attack status query received at the security service provider by sending given processed attack information pertaining substantially to a given source address of that query.

* * * * *